No. 687,298. Patented Nov. 26, 1901.
H. G. CADY.
TIMBER OR LOG BUOY.
(Application filed July 25, 1901.)
(No Model.)
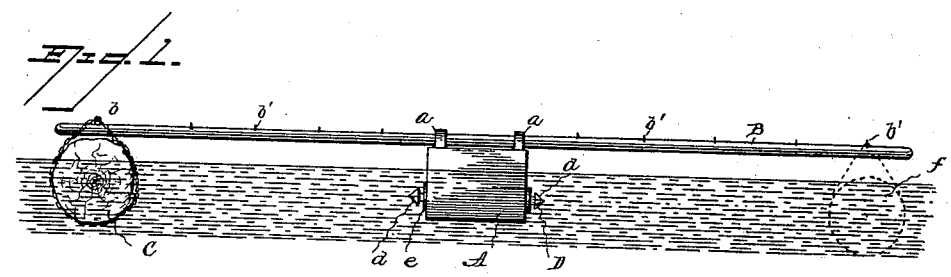
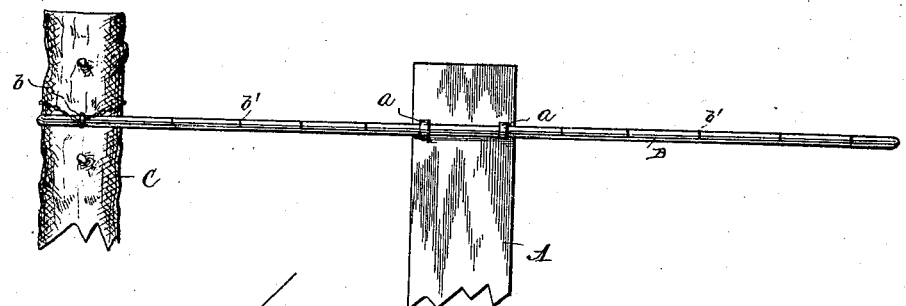
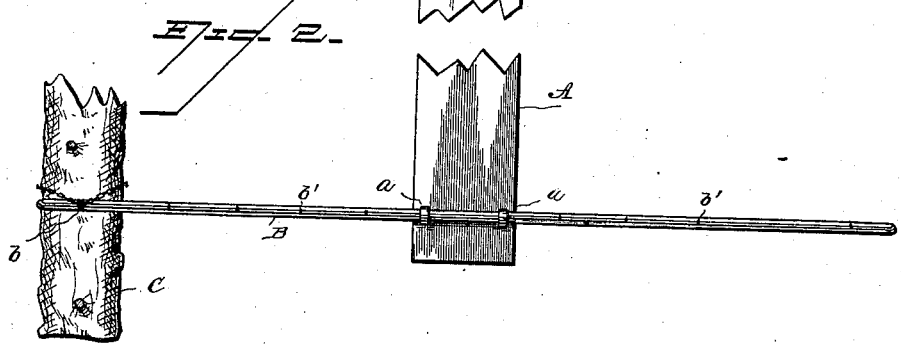
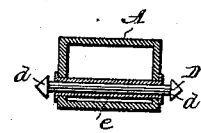
Witnesses
R. J. Beall
Frank S. Maguire
Henry G. Cady,
Inventor,
by John Thomas,
Attorneys.
THE NORRIS PETERS CO., PHOTO-LITHO., WASHINGTON, D. C.

UNITED STATES PATENT OFFICE.

HENRY GORDON CADY, OF PINE BLUFF, ARKANSAS.

TIMBER OR LOG BUOY.

SPECIFICATION forming part of Letters Patent No. 687,298, dated November 26, 1901.

Application filed July 25, 1901. Serial No. 69,690. (No model.)

*To all whom it may concern:*

Be it known that I, HENRY GORDON CADY, a citizen of the United States, and a resident of Pine Bluff, in the county of Jefferson and State of Arkansas, have invented a Timber or Log Buoy, of which the following is a specification.

The object of this invention is to provide effective means for raising and floating sunken logs; and it contemplates the employment of a long box-shaped buoy or float, poles extending across said float and attached thereto, together with a buoyant log fastened to one end of the poles whereby heavy or non-buoyant logs may be conveniently raised and supported to form a raft for floating such logs upon a river or stream, the raft so formed being such that the float will be protected from injury by the logs.

My invention embodies an arrangement by which the long float and buoyant log are disposed parallel with the heavier logs and the poles arranged transversely to provide the means by which the sunken logs may be raised from the bottom of a river or stream and suspended from said poles.

The following specification enters into a detail description of my invention, reference being had to the accompanying drawings, and to letters of reference thereon, which designate the different parts, and what I claim in the construction and combination is more specifically set forth in the appended claims.

In the drawings, Figure 1 is an end view showing the application of my invention. Fig. 2 is a plan view. Fig. 3 is a sectional view through the float.

In carrying out my invention I employ a long buoy or float A, preferably rectangular in cross-section, said float being made up of boards securely connected together and properly calked to prevent water from entering the same. Though a rectangular float is preferred a cylindrical float may be used, and in some instances it may be desirable to construct the same of sheet metal. A wooden box or float will be preferred, however, as it is cheaper in construction and may be more serviceable for the purposes of my invention.

Across the buoy or float are secured poles B B, attached to said float by means of staples $a$, the said poles being provided with staples $b'$, by which the sunken logs are attached thereto. At one end of the poles is a buoyant log C, fastened thereto by means of a chain which passes through staples $b$ in the poles. Near each end of the float is a bar D, having heads $d$, the said bar playing in a collar $e$, extending through the float from one side to the other. This bar receives the impact of the logs and prevents the float from being crushed, as said float has a movement on the poles and the logs are held apart or away from the float by said bars.

In raising sunken logs with the apparatus consisting of the float A, buoyant log C, and transversely-arranged poles B a chain is attached to a pole at its end opposite the log C and passed under one end of the sunken log and is then drawn upon to lift said log. A chain is then attached to the other pole, and the other end of the sunken log is lifted. If the water is very deep, first one end of the log is lifted a short distance and then the other end, and so on until it is lifted to the surface of the water and attached to the poles, as shown at $f$ in the drawings. Other logs are raised and attached first on one side of the float and then the other alternately, so that at all times the device will be properly balanced in the water.

By the use of the apparatus herein shown and described logs which are too heavy to float, and are therefore sunken to the bottom of streams and rivers, may be readily and conveniently raised and formed into a raft, whereby said logs can be rafted to a sawmill or other place desired.

Having thus described my invention, what I claim as new, and desire to secure by Letters Patent, is—

1. In a device for floating sunken logs, the combination, of a long float, and poles extending transversely across the top of said float, substantially as shown and described.

2. In a device for raising and floating sunken logs, the combination, of a long float, poles arranged transversely of the float and attached thereto, the ends of the poles projecting beyond either side of said float, and a buoyant log connected to one end of said poles, substantially as shown and for the purpose set forth.

3. In a device for raising and floating sunken logs, the combination, of a long float, poles arranged transversely of the float and attached thereto, staples attached to the upper side of said poles, and a buoyant log connected to one end of the poles, substantially as shown and described.

4. In a device for raising and floating sunken logs, the combination, of a long float, poles extending across the float and attached thereto, a buoyant log attached to one end of the poles, a collar or sleeve extending transversely through the float, and a bar playing in said collar, substantially as shown and for the purpose set forth.

HENRY GORDON CADY.

In presence of—
  F. C. FURTH,
  J. D. WILBOURNE.